(12) United States Patent
Watanabe et al.

(10) Patent No.: US 8,901,788 B2
(45) Date of Patent: Dec. 2, 2014

(54) ELECTRIC MOTOR WITH ROTATING BODY AND ELECTRIC DEVICE PROVIDED THEREWITH

(75) Inventors: Akihiko Watanabe, Osaka (JP);
Takehiko Hasegawa, Osaka (JP);
Hirofumi Mizukami, Osaka (JP);
Haruhiko Kado, Osaka (JP); Genki Kondo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/384,008

(22) PCT Filed: Sep. 7, 2010

(86) PCT No.: PCT/JP2010/005481
§ 371 (c)(1),
(2), (4) Date: Jan. 13, 2012

(87) PCT Pub. No.: WO2011/030536
PCT Pub. Date: Mar. 17, 2011

(65) Prior Publication Data
US 2012/0112588 A1    May 10, 2012

(30) Foreign Application Priority Data
Sep. 10, 2009 (JP) ................. 2009-208901

(51) Int. Cl.
*H02K 1/30* (2006.01)
(Continued)

(52) U.S. Cl.
CPC ............ *H02K 1/276* (2013.01); *H02K 11/0005* (2013.01); *H02K 11/0089* (2013.01); *H02K 5/1732* (2013.01)
USPC ............................. 310/51; 310/90; 310/156.53

(58) Field of Classification Search
CPC ....... H02K 1/2706; H02K 1/272; H02K 1/28; H02K 1/30; H02K 1/27; H02K 21/12; H02K 21/14
USPC ......................... 310/90, 51, 156.53, 112, 114

IPC ................. H02K 1/27, 1/22, 1/30, 17/12, 21/12, H02K 21/14
See application file for complete search history.

(56) References Cited

U.S. PATENT DOCUMENTS 4,126,933 A * 11/1978 Anderson et al. ........ 310/156.51
4,393,320 A *  7/1983 Anderson ................ 310/156.77
(Continued)

FOREIGN PATENT DOCUMENTS

EP          2161816 A1    3/2010
JP        06-261507 A     9/1994
(Continued)

OTHER PUBLICATIONS

Machine translation of WO 2009/001546 A1 (translated Aug. 2012, published Dec. 2008).*

(Continued)

*Primary Examiner* — Michael Andrews
(74) *Attorney, Agent, or Firm* — Brinks Gilson & Lione

(57) ABSTRACT

Provided is an electric motor driven by an inverter of PWM method, and devised to retard electrolytic corrosion in a bearing. A rotating body of a rotor comprises an outer iron core configuring an outer peripheral portion of the rotating body, an inner iron core configuring an inner peripheral portion connected to a shaft, a dielectric layer disposed between the outer iron core and the inner iron core, a plurality of insertion holes penetrating the outer iron core in the axial direction, and permanent magnets inserted individually in the plurality of insertion holes. It thus becomes possible to increase impedance of the rotor side (inner ring side of bearing) to approximate it to impedance of the stator side (outer ring side of the bearing) to thereby bring high frequency potentials balanced between the inner ring side and the outer ring side of the bearing, so as to provide the electric motor that retards electrolytic corrosion liable to occur in the bearing, and an electric device equipped with the same.

10 Claims, 15 Drawing Sheets

(51) Int. Cl.
*H02K 11/00* (2006.01)
*H02K 1/27* (2006.01)
*H02K 21/14* (2006.01)
*H02K 5/173* (2006.01)

(56) References Cited

U.S. PATENT DOCUMENTS

| | | | | |
|---|---|---|---|---|
| 6,144,131 A | * | 11/2000 | Hollenbeck et al. | 310/156.53 |
| 2003/0090167 A1 | * | 5/2003 | Kajiura et al. | 310/156.36 |
| 2005/0253480 A1 | | 11/2005 | Pizzichil | |
| 2006/0103253 A1 | * | 5/2006 | Shiga et al. | 310/156.45 |
| 2008/0042499 A1 | | 2/2008 | Okada | |
| 2009/0058202 A1 | * | 3/2009 | Jeung | 310/51 |

FOREIGN PATENT DOCUMENTS

| | | | | |
|---|---|---|---|---|
| JP | 2001-320844 A | | 11/2001 | |
| JP | 2004-229429 A | | 8/2004 | |
| JP | 2006-187144 A | | 7/2006 | |
| JP | 2007-116839 A | | 5/2007 | |
| JP | 2007116839 A | * | 5/2007 | H02K 5/16 |
| JP | 2007-159302 A | | 6/2007 | |
| JP | 2008-263698 A | | 10/2008 | |
| JP | 2008-289272 A | | 11/2008 | |
| WO | WO 2009/001546 A1 | | 12/2008 | |
| WO | WO 2009001546 A1 | * | 12/2008 | H02K 5/16 |

OTHER PUBLICATIONS

International Search Report for International Application No. PCT/JP2010/005481, dated Oct. 26, 2010, 2 pages.

Extended Search Report for corresponding European patent application No. 10815136.6, dated Jul. 8, 2014, 8 pages.

* cited by examiner

FIG. 13A
FIG. 13B
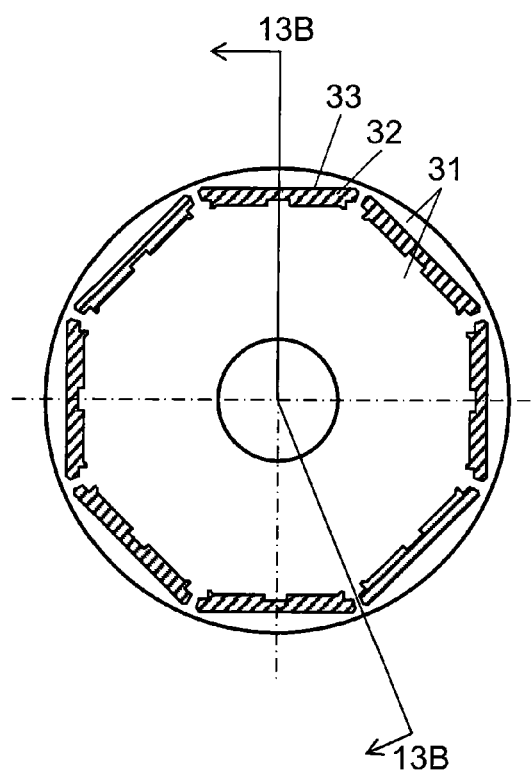
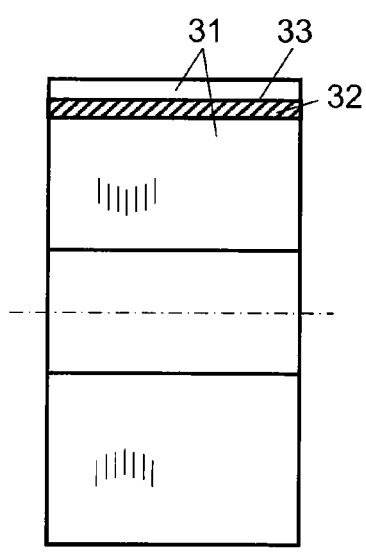

ELECTRIC MOTOR WITH ROTATING BODY AND ELECTRIC DEVICE PROVIDED THEREWITH

TECHNICAL FIELD

The present invention relates to an electric motor provided with a rotor having permanent magnets inserted individually into insertion holes, and more particularly to an improvement made in the electric motor to retard electrolytic corrosion that occurs in a bearing.

BACKGROUND ART

There are increasing cases in recent years where electric motors are adapted to driving systems that use inverters of pulse width modulation method (hereinafter referred to as PWM method). In the case of inverter driving such as the PWM method, there appears a potential difference between an outer ring and an inner ring of a bearing (hereinafter referred to as a shaft voltage) since an electric potential at a neutral point of a coil winding does not become zero. The shaft voltage includes high frequency components due to switching, and a small electric current flows in the bearing that causes electrolytic corrosion inside the bearing when the shaft voltage reaches a dielectric breakdown potential of an oil film in the bearing. A phenomenon of wave-like wear occurs in the inner ring, the outer ring and bearing balls of the bearing when the electrolytic corrosion progresses, and this gives rise to the possibility of abnormal noise, which becomes one of the major causes of problem in the electric motor.

Note that a power supply circuit for a drive circuit (including a control circuit and the like) that drives the electric motor with an inverter of the PWM method has been so constructed that it is electrically isolated from a primary circuit of the power supply circuit and an earth connection to the ground in the primary circuit side.

Shown below are some of the measures hitherto contrived to retard the electrolytic corrosion:

(1) by maintaining electrical continuity between an inner ring and an outer ring of the bearing;

(2) by isolating electrically between the inner ring and the outer ring of the bearing; and (3) by reducing the shaft voltage.

Specific methods of achieving the above measure (1) include the use of electrically conductive lubricant for the bearing. However, the electrically conductive lubricant has problems such as deterioration of the conductivity with time, lack of the sliding reliability and the like. Also conceivable as the method of maintaining the electrical continuity is to install a brush on a rotary shaft. But this method still has other problems such as needing an additional space and dust produced from worn brush.

Specific methods relevant to the above measure (2) include the use of non-conductive ceramic balls to replace iron balls in the bearing. While this method is very effective to retard the electrolytic corrosion, it has a problem of high cost and not practical for application to the general-purpose motors.

One of the specific methods thitherto known to achieve the above measure (3) is to change an electrostatic capacitance and reduce the shaft voltage by electrically shorting a stator core and an electrically conductive metal bracket (refer to patent literature 1 for example). Among the conventional techniques for retarding the electrolytic corrosion in the bearing of electric motor, there are many structures disclosed, in which the stator core and the like of the electric motor are connected electrically with the earth ground (refer to patent literature 2 for example).

Incidentally, an electrostatic capacitance and a resistance connected in parallel has an impedance given by the expression of $Z=1/j\omega C+R$, where Z is the impedance, j is an imaginary number, $\omega$ is an angular frequency, C is the electrostatic capacitance and R is the resistance. As is known from this expression, the impedance decreases when the electrostatic capacitance increases or the resistance decreases. Conversely, the impedance increases when the electrostatic capacitance decreases or the resistance increases.

In patent literature 1, an impedance on the stator side is decreased by shorting the stator core and the bracket, and thereby reducing the electrolytic corrosion of the bearing.

In other words, electric motors used in water-related products such as washing machines and dishwasher-dryers that pose potential risk of electric shock are generally required to have an independent insulation (hereinafter referred to as supplementary insulation) in addition to the insulation for live parts (i.e., basic insulation). On the other hand, electric motors used for indoor units and outdoor units of air conditioners, water heaters, air cleaners and the like do not require any supplementary insulation since they are unlikely to pose the risk of electric shock. Accordingly, the motors used for indoor units and outdoor units of air conditioners, water heaters, air cleaners and the like have low impedance on the rotor side (i.e., inner ring side of the bearing) since their rotors are not provided with insulated structure. On the other hand, they have high impedance on the stator side (outer ring side of the bearing) because of their insulated structure. In this case, it is likely that a high shaft voltage appears due to an unbalanced condition resulting from a high potential of the inner-ring side of the bearing as compared to a low potential of the outer-ring side of the bearing. It is the shaft voltage of such a high potential that raises the possibility of developing electrolytic corrosion in the bearing.

To avoid such a condition, the method adopted in patent literature 1 eliminates an electrostatic capacitive component between the stator core and the bracket by shorting them, thereby reducing the impedance of the stator side (outer-ring side of the bearing) as discussed above and approximating it to the impedance of the rotor side (inner-ring side of the bearing).

Also proposed recently is a molded motor with improved reliability, in which fixing members such as a stator core at the stator side are molded with a molding material. It is conceivable here that the bearing is fixed with an insulation molding material in lieu of a metal bracket to prevent an undesirable high-frequency voltage from being generated on the outer-ring side of bearing and suppress an unwanted high-frequency current that flows between the outer ring and the inner ring of the bearing. There exist problems, however, because any of such molding materials is a synthetic resin that it has strength not sufficient to secure the bearing, poor accuracy of dimensions attributable to resin molding, and it is prone to a trouble of creeping in the bearing. In other words, it is normally likely that a shaft-bearing member such as this bearing exerts a force on the shaft in the radial direction due to a load being transmitted if there is a gap, for instance, between the outer ring and an inner surface of a housing. A slipping phenomenon tends to occur due to a relative difference in the radial direction when such a force is exerted, and that this slipping phenomenon is called creeping. In general, creeping of this nature can be suppressed by securely fixing the outer ring to the housing such as a bracket. It also becomes necessary to fix the bearing more securely to cope with the recent trend toward higher power output of electric motors. It is indispensable for this purpose to take measures against creeping, such as preparing beforehand a metal bracket formed of a steel plate having dimensions of high preciseness for fixation of the bearing. A general structure of the bearing, in particular, is to support the rotary shaft at two positions, and it is preferable to fix two bearings with the metal bracket for the reason of robustness and ease of embodiment as discussed here.

Some problems exist, however, with the conventional method shown in patent literature 1 as follows. That is, this conventional method precludes adjustment of impedance since it is the method of electrical shorting, which tends to cause a high shaft voltage depending on a magnet material and a structure of the rotor. Another problem to be cited is the need to always maintain the balance of electric potentials at their high levels between the inner ring and the outer ring of the bearing since it is the method of decreasing the impedance. Consideration has been given, as a possibility under such a condition that there is a case where electrolytic corrosion becomes liable when the shaft voltage increases contrary to the intention as a result of imbalance in the impedance attributed to a use environment of the motor, a deviation in the precision of assembling the stator and the rotor, and the like.

When a metal bracket is used for the reason of robustness as discussed above, there exists another possibility that impedance on the stator side decreases as compared with the structure of fixing the bearing by using the molding material such as an insulation resin. The possibility that has been considered is a case where the bearing becomes prone to electrolytic corrosion when the metal bracket is used because it reduces an insulation property and allows an electric current to flow between the inner ring and the outer ring of the bearing, whereas a resin housing keeps a condition of prohibiting the electric current from flowing between the inner ring and the outer ring of the bearing due to its high insulation property. The use of a conductive bracket has also posed a problem similar to that of patent literature 1 since it decreases impedance of the stator, which increases electric potentials of both the inner ring and the outer ring of the bearing.

As discussed above, the structure related to the problems addressed in this patent application is so constructed that a power supply circuit of the drive circuit (including a control circuit and the like) for driving the electric motor with an inverter of the PWM method is electrically isolated from a primary circuit of the power supply circuit and an earth connection to the ground in the primary circuit side. It is therefore difficult in view of specifications and characteristics of the motor besides other problems requiring consideration to aim at resolving the problems by employing any of structures of the conventional art of electrically connecting the stator core and the like of the motor to the earth ground, in addition to associated structures.

PTL 1: Japanese Patent Unexamined Publication, No. 2007-159302
PTL 2: Japanese Patent Unexamined Publication, No. 2004-229429

SUMMARY OF THE INVENTION

An electric motor of the present invention comprises a stator having a stator core and a coil wound around the stator core, a rotor having a rotating body positioned inside the stator and a shaft connected to the rotating body in a manner to penetrate through the center of the rotating body, a bearing rotatably supporting the shaft, and a bracket fixing the bearing. The rotating body has a structure comprising an outer iron core that configures an outer peripheral portion of the rotating body, an inner iron core that configures an inner peripheral portion connected to the shaft, a dielectric layer disposed between the outer iron core and the inner iron core, a plurality of insertion holes that penetrate the outer iron core in the axial direction, and permanent magnets inserted individually into the plurality of insertion holes.

The rotor of low impedance thus composed of the dielectric layer disposed between the outer iron core and the inner iron core makes up a structure equivalent to a series connection consisting of an electrostatic capacitance formed by the dielectric layer, and it thereby increases the impedance on the rotor side. It becomes possible by increasing the impedance on the rotor side in this way to approximate it to a high value of the impedance on the stator side, thereby making high frequency potentials well balanced in a manner that they become equivalent between the inner ring side and the outer ring side of the bearing. Since the impedances of the stator side and the rotor side are kept to high values, the electric potentials can be balanced at a low level between the inner ring side and the outer ring side of the bearing, which can help reduce the shaft voltage without being influenced by the use environment and the like.

The electric motor of the present invention also comprises two conductive brackets connected to each other but electrically insulated from the stator core.

By virtue of this structure of electrically connecting two brackets, it becomes possible to equalize the electric potentials of both the brackets, and to make a potential difference between an inner ring and an outer ring of one bearing equal or close to a potential difference between an inner ring and an outer ring of the other bearing. In such a structure, the potential difference between the inner ring and the outer ring, or the shaft voltage, can be decreased for each of the bearings by properly adjusting the impedance of the rotor side by using the dielectric layer. It thus becomes possible to retard the electrolytic corrosion of the bearings that occur due to high frequency currents by the PWM and the like while ensuring the fixing strength of the two bearings with the conductive brackets, since the potential difference between the inner ring and the outer ring of each bearing can be decreased in this manner.

In addition, the impedance on the rotor side can be set to an optimum value since the electrostatic capacitance is variable by changing a width and material of the dielectric layer. Here, the dielectric layer refers to a layer of dielectric substance, of which dielectric constant and a thickness, and a surface area of a conductive material (electrode) in contact with the dielectric substance can be changed intentionally, as if it is a dielectric element intended to be interposed between the shaft and the rotating body.

Furthermore, the structure having the two brackets insulated from the stator core can increase the impedance on the stator side. That is, the electric potentials of both the inner ring side and the outer ring side of the bearing can be decreased by increasing the impedance on the stator side as well as the impedance on the rotor side by means of the dielectric layer in the manner as discussed above. In addition, the electric potentials on the inner ring side and the outer ring side of the bearing can be balanced at a low level, so as to help reduce the shaft voltage without receiving any influence from the use environment and the like.

Moreover, the electric motor of the present invention has a structure, wherein at least one of the two brackets and the stator core having the coil wound thereon are integrally molded with an insulation resin.

In this structure, the two conductive brackets are electrically connected with a connector pin or the like in the electric motor to achieve the electrical connection of high reliability against the use environment, external stress and the like.

Furthermore, the electric motor of the present invention has a structure provided with the dielectric layer so formed as to encircle around the shaft.

Moreover, the electric motor of the present invention has a structure, wherein the outer iron core and the inner iron core are fixed with the dielectric layer between them.

The electric motor of the present invention has the dielectric layer disposed in a manner to separate and insulate between an inner side and an outer side thereof.

The structure constructed in this manner can improve productivity of the rotor having high impedance on the rotor side since the rotating body of this structure is easily manufacturable.

In addition, the electric motor of the present invention has the dielectric layer comprising a main body formed to encircle around the shaft, and a plurality of protruding portions protruding from the main body, wherein each of the protruding portions is in contact with respective one of permanent magnets.

In another aspect, the electric motor of the present invention is so constructed that the individual protruding portions protrude from the main body to the direction of outer periphery at an intermediate area between an upper end surface and a lower end surface of the rotating body.

In addition, the electric motor of the present invention may be so constructed that the individual protruding portions protrude from the main body to the direction of outer periphery at both the upper end surface and the lower end surface of the rotating body.

The structure constructed as above can easily improve retaining strength of the permanent magnets since the protruding portions of the dielectric layer can securely fix the permanent magnets inserted in the insertion holes in addition to the function of the dielectric layer to suppress the occurrence of electrolytic corrosion.

Furthermore, the electric motor of the present invention has a structure, wherein the dielectric layer is so provided as to increase impedance between the stator core and the shaft.

In addition, an electric device of the present invention is equipped with the electric motor discussed above.

BRIEF DESCRIPTION OF THE DRAWINGS

FIG. 13A is a top view showing a structure of a rotating body of the brushless motor of reference sample 1;

FIG. 13B is a drawing showing a section taken along line 13B-13B of FIG. 13A;

DETAILED DESCRIPTION OF THE PREFERRED EMBODIMENTS

First Exemplary Embodiment

Figure 1:
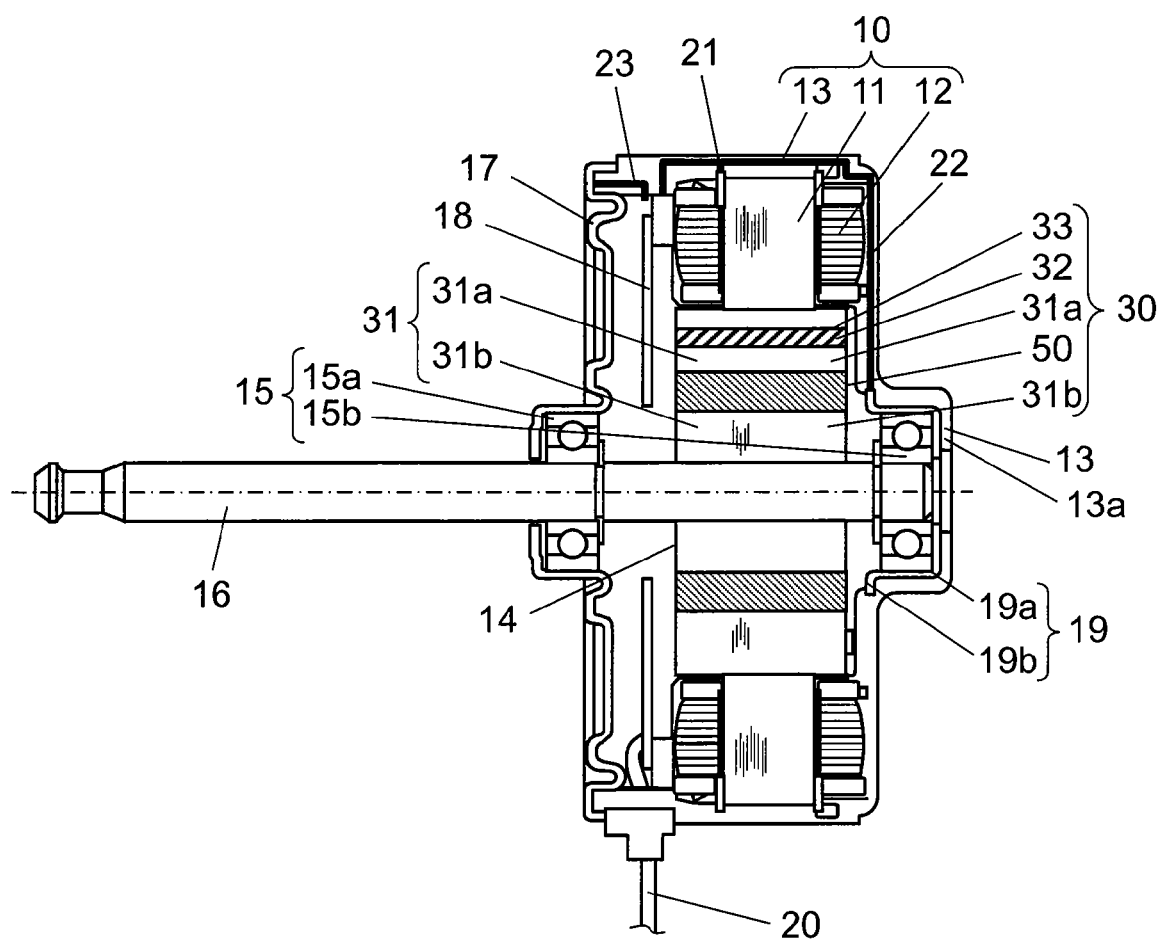
FIG. 1 is a structural drawing showing a section of a brushless motor according to a first exemplary embodiment of the present invention.

FIG. 1 is a structural drawing showing a section of an electric motor according to the first exemplary embodiment of this invention. In this embodiment, description is provided of a brushless motor as an example of the electric motor mounted inside an air conditioner representing an electric device for driving a blower fan. The example described in this embodiment is an inner-rotor type electric motor having a rotor arranged inside a stator in a freely rotatable manner.

In FIG. 1, stator coil 12 is wound around stator core 11 with resin 21 interposed between them as an insulator for insulating stator core 11. Stator core 11 of this structure is molded with insulation resin 13 used as a molding material together with other fixing members. In this embodiment, stator 10 having an outward appearance of generally a cylindrical shape is formed of these members by integrally molded in this fashion.

Rotor 14 is inserted into stator 10 with a gap provided between them. Rotor 14 comprises disc-like rotating body 30 including rotor core 31, and shaft 16 connected to rotating body 30 in a manner to penetrate through the center of rotating body 30. Rotating body 30 has a structure comprising outer iron core 31a configuring an outer peripheral portion of rotor core 31, dielectric layer 50, and inner iron core 31b configuring an inner peripheral portion of rotor core 31, which are arranged in this order from the outermost side toward shaft 16 at the innermost side as shown in FIG. 1, as details of which are described herein below. Rotating body 30 is so disposed that an outer peripheral side of it confronts an inner peripheral side of stator 10. Outer iron core 31a has a plurality of insertion holes 33 penetrating in the axial direction parallel with shaft 16. In addition, permanent magnets 32 are inserted individually in each of insertion holes 33. Permanent magnets 32 used in this embodiment are neodymium group rare-earth sintered magnets, although sintered magnets of any other rare-earth group material and ferrite group material or resin magnets are also suitable for use depending on characteristics of the electric motor.

Two bearings 15 are attached to shaft 16 of rotor 14, and support shaft 16. Bearings 15 are cylindrically-shaped bearings, each having a plurality of steel balls, and inner ring side of each bearing 15 is fixed to shaft 16. In FIG. 1, output-shaft side bearing 15*a* supports shaft 16 at an output-shaft side where shaft 16 extends from the main body of the brushless motor, and un-output-shaft side bearing 15*b* supports shaft 16 at the opposite side (hereinafter referred to as un-output-shaft side) of shaft 16. These bearings 15 are fixed from their outer-ring sides with respective metal brackets having electrical conductivity. In FIG. 1, output-shaft side bearing 15*a* is fixed with output-shaft side bracket 17, and un-output-shaft side bearing 15*b* is fixed with un-output-shaft side bracket 19. Shaft 16 is supported by two bearings 15 in the above structure, which thus makes rotor 14 freely rotatable.

In addition, this brushless motor is equipped internally with printed board 18, whereon a drive circuit including a control circuit is mounted. The brushless motor is composed by press-fitting output-shaft side bracket 17 into stator 10 after this printed board 18 is built in. Printed board 18 is also connected with connecting cable 20 including lead wires for applying power supply voltage Vdc to the coil, power supply voltage Vcc to the control circuit and control voltage Vsp for controlling rotating speed, and a grounding wire of the control circuit.

A zero potential point on printed board 18 bearing the drive circuit is isolated from the earth ground and the primary (i.e., power supply) circuit, and therefore kept in a floating condition from electric potentials of the earth ground and the primary power supply circuit. Here, the zero potential point means a wiring trace of zero-volt potential defined as the reference potential on printed board 18, and it represents ground wiring that are normally called the ground. The grounding wire included in connecting cable 20 is connected with this zero potential point, or the ground wiring. All of the power supply circuit for supplying the supply voltage to the coil, another power supply circuit for supplying the supply voltage to the control circuit, the lead wire for applying the control voltage, the grounding wire of the control circuit and the like connected with printed board 18 where the drive circuit is mounted are electrically insulated from any of the primary (power supply) circuit corresponding to the power supply circuit for supplying the supply voltage to the coil, another primary (power supply) circuit corresponding to the power supply circuit for supplying the supply voltage to the control circuit, the grounding wire connected with these primary (power supply) circuits and a grounding wire connected independently to the earth ground. In other words, the drive circuit mounted on printed board 18 is floating in the electric potential since the drive circuit is insulated electrically from the electric potentials of the primary (power supply) circuits and the earth ground. This condition is expressed as floating potential and well known. This structure of the power supply circuits connected to printed board 18 for supplying the supply voltage to the coil and the supply voltage to the control circuit is called floating power supply for the same reason, and it is also the well-known expression.

When the brushless motor constructed as above is supplied with individual power supply voltages and a control signal via connecting cable 20, rotor 14 rotates about shaft 16.

Description is provided next of the structure of this brushless motor in further detail.

As described above, this brushless motor has two bearings 15 to support shaft 16, and bearings 15 are individually fixed and supported with the brackets. In addition, this embodiment has the structure, wherein the individual bearings 15 are fixed with the metal brackets having electrical conductivity in order to suppress a trouble attributed to the creeping as discussed above. In other words, this embodiment employs the electrically conductive brackets of high dimensional preciseness fabricated beforehand with a steel plate for fixation of bearings 15. It is desirable to employ the structure of this type especially when a high power is desired for the electric motor.

To begin with specifically, un-output-shaft side bearing 15*b* is fixed with un-output-shaft side bracket 19 having an outer diameter generally equal to that of un-output-shaft side bearing 15*b*. In addition, this un-output-shaft side bracket 19 is integrally molded with insulation resin 13. That is, a shape of insulation resin 13 at the un-output-shaft side is such that it has main body protrusion 13*a* that protrudes in a direction of the un-output shaft from the main body of the brushless motor, as shown in FIG. 1. Un-output-shaft side bracket 19 is placed in the interior side of this main body protrusion 13*a* as an inner bracket, and integrally molded with insulation resin 13. Un-output-shaft side bracket 19 has an open-sided cylindrical shape resembling the shape of a cup, and to be more specific, it has cylindrical portion 19*a* with one side opened, and annular flange 19*b* extending slightly in the outward direction from the edge of the open side. An inner diameter of cylindrical portion 19*a* is generally equal to an outer diameter of un-output-shaft side bearing 15*b*, so that un-output-shaft side bearing 15*b* is fixed with insulation resin 13 through un-output-shaft side bracket 19 when un-output-shaft side bearing 15*b* is press-fitted into cylindrical portion 19*a*. It becomes possible by virtue of this structure to suppress the trouble due to the creeping since the outer-ring side of un-output-shaft side bearing 15*b* is fixed to metallic un-output-shaft side bracket 19. Moreover, annular flange 19*b* is formed to have an outer diameter slightly larger than the outer diameter of un-output-shaft side bearing 15*b*. That is, the outer diameter of annular flange 19*b* is larger than the outer diameter of un-output-shaft side bearing 15*b* but at least smaller than an outer diameter of rotating body 30. Un-output-shaft side bracket 19 made to have such a shape reduces usage of the metal material as compared with an annular flange if formed into such a structure that extends beyond the outer periphery of rotating body 30 toward stator 10, for instance, that can become costly. It is also possible to suppress noises that occur from un-output-shaft side bearing 15*b* because an outer surface of un-output-shaft side bracket 19 is covered with insulation resin 13 in addition to the reduction in surface area of metallic un-output-shaft side bracket 19.

Secondly, output-shaft side bearing 15*a* is fixed with output-shaft side bracket 17 having an outer diameter nearly equal to an outer diameter of stator 10. Output-shaft side bracket 17 has generally a disc shape, and it is provided in the center thereof with a protruding portion of a diameter generally equal to an outer diameter of output-shaft side bearing 15*a*, and this protruding portion is hollow inside. The brushless motor is completed after printed board 18 is mounted therein, and output-shaft side bracket 17 is press-fitted to stator 10 in a manner that output-shaft side bearing 15*a* fits inserted in the interior side of the protruding portion, and connection terminals provided on an outer perimeter of output-shaft side bracket 17 engage with connection terminals of stator 10. The structure constructed as above achieves the ease of assembling process in addition to suppressing the trouble attributed to the creeping since the outer ring side of output-shaft side bearing 15*a* is fixed to metallic output-shaft side bracket 17.

Un-output-shaft side bracket 19 is provided in advance with conductive pin 22 electrically connected with it. In other words, one end of conductive pin 22 is connected to un-output-shaft side bracket 19, as shown in FIG. 1. Conductive pin 22 is disposed within insulation resin 13, and molded integrally with insulation resin 13 in the same fashion as un-output-shaft side bracket 19. Conductive pin 22 disposed within insulation resin 13 as a part inside the electric motor is to protect conductive pin 22 from rust and external forces, and to ensure high reliability of the electrical connection against the use environment and external stress. Conductive pin 22 extends within insulation resin 13 from un-output-shaft side bracket 19 toward the outer periphery of this brushless motor, and it further extends from the vicinity of the outer periphery to the output-shaft side in the direction generally parallel to shaft 16 of the brushless motor. The other end of conductive pin 22 is exposed from an end surface on the output-shaft side of insulation resin 13. In addition, the other end of conductive pin 22 is connected to conductive pin 23 for electrical connection with output-shaft side bracket 17. That is, conductive pin 23 comes into contact with output-shaft side bracket 17 to secure electrical continuity between output-shaft side bracket 17 and conductive pin 23 when output-shaft side bracket 17 is press-fitted to stator 10. The electrical connection through conductive pin 22 can be thus ensured between the two brackets, or output-shaft side bracket 17 and un-output-shaft side bracket 19, by virtue of this structure. While output-shaft side bracket 17 and un-output-shaft side bracket 19 are electrically connected, these two brackets are insulated from stator core 11 with insulation resin 13.

In this embodiment, rotating body 30 is provided with dielectric layer 50 between shaft 16 and the outer periphery of rotating body 30.

Figure 2:
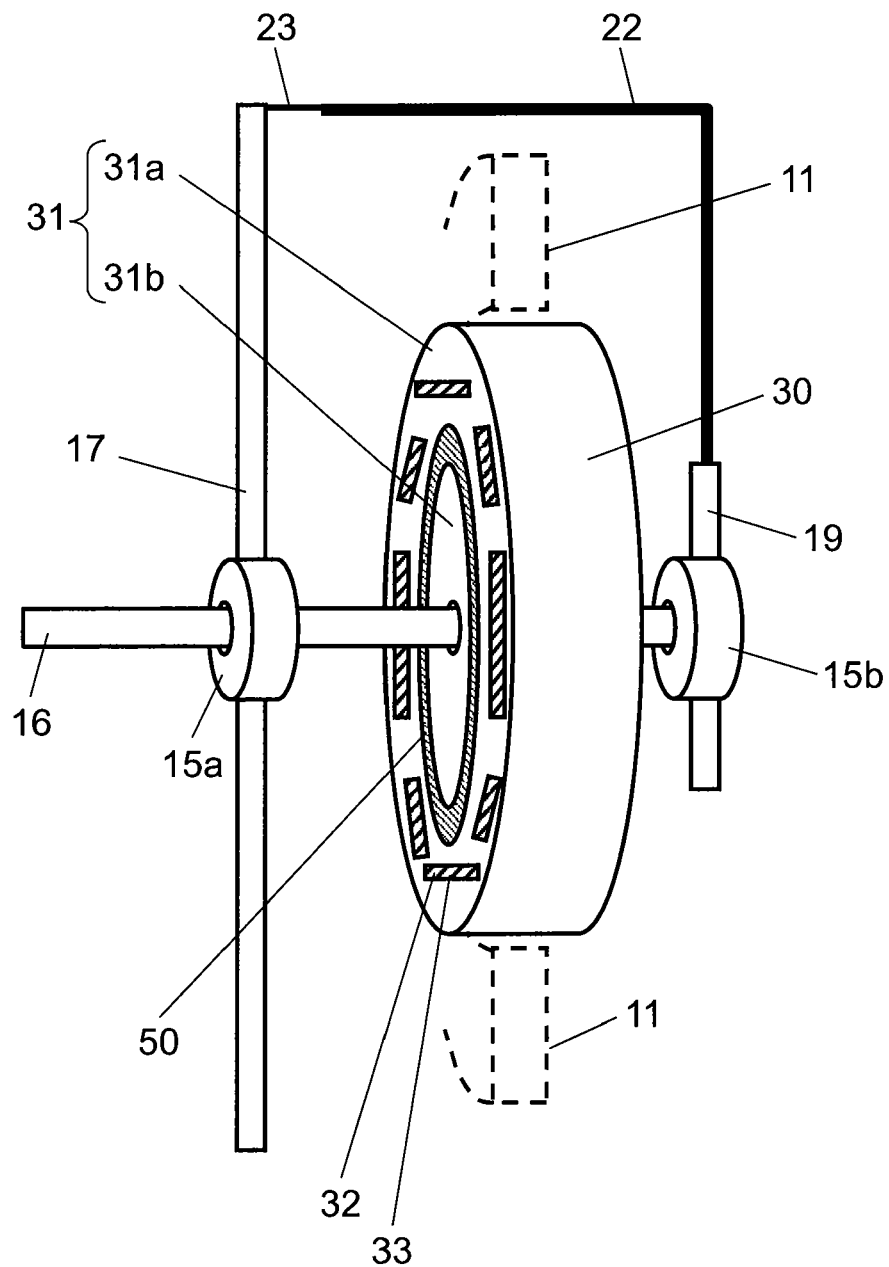
FIG. 2 is a drawing schematically illustrating main parts of the brushless motor.

FIG. 2 is a drawing schematically illustrating main parts of the brushless motor according to the first embodiment of this invention. As shown in FIG. 2, output-shaft side bracket 17 and un-output-shaft side bracket 19 are electrically connected through conductive pins 22 and 23, but they are not connected with stator core 11.

Here, output-shaft side bracket 17 and un-output-shaft side bracket 19 have different impedances when they are not connected since these brackets are different in the shapes and positional arrangements. It is for this reason that an imbalance occurs in the electric potentials induced in output-shaft side bracket 17 and un-output-shaft side bracket 19. This imbalance is a cause for concern about a condition that a high-frequency current is likely to flow through shaft 16 either from the output-shaft side to the un-output-shaft side, or from the un-output-shaft side to the output-shaft side.

This embodiment suppresses the imbalance of the electric potentials by electrically connecting output-shaft side bracket 17 and un-output-shaft side bracket 19 and equalizing the potentials between the two brackets, thereby maintaining a condition of preventing the high-frequency current from flowing through shaft 16.

If conductive pin 22 for connecting output-shaft side bracket 17 and un-output-shaft side bracket 19 is also connected to stator core 11, it reduces the impedance on the stator side. When this is the case, an electric potential on the stator side, or the outer ring side of the bearing increases due to the low impedance, as discussed above. On the other hand, this embodiment maintains the electric potential on the outer ring side of the bearing suppressed to a low level by insulating between conductive pin 22 and stator core 11 and avoiding the decrease in the impedances. This also helps make the impedances on the stator side and the rotor side easily balanced as will be described below. In addition, this embodiment can achieve the electrical connection between output-shaft side bracket 17 and un-output-shaft side bracket 19 while ensuring the isolation of them from stator core 11 by simply press-fitting output-shaft side bracket 17 to stator 10, as stated above. This can thus ease equalization of the electric potentials on both brackets in the manufacturing process while avoiding a decrease in the impedance on the stator side.

Figure 3A:
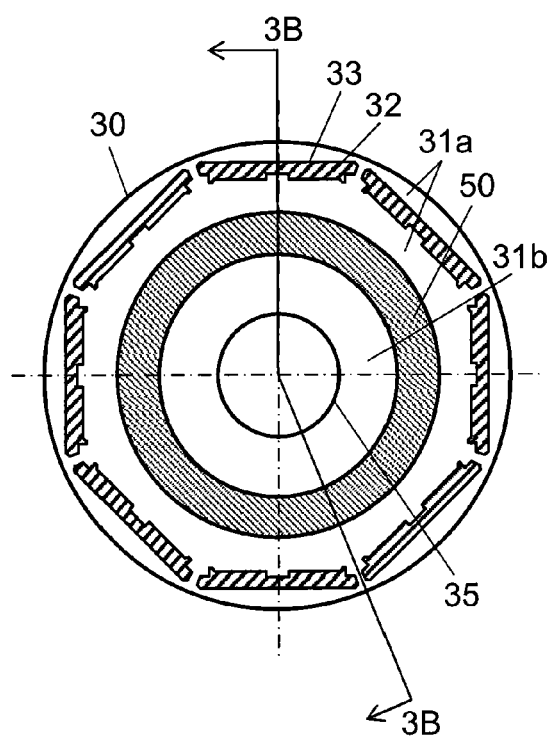
FIG. 3A is a top view showing a structure of a rotating body of the brushless motor.
Figure 3B:
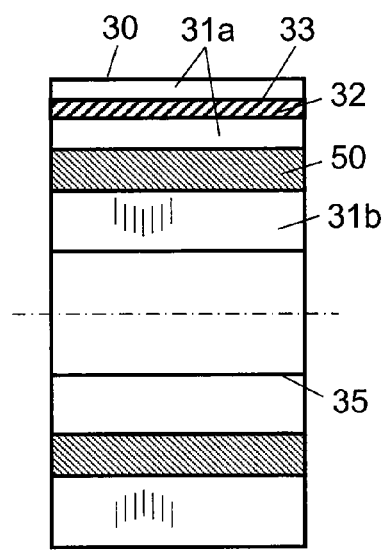
FIG. 3B is a drawing showing a section taken along line 3B-3B of FIG. 3A.

Description is provided next of rotating body 3 in more detail. FIGS. 3A and 3B illustrate a top view of rotating body 30 of the brushless motor and a section taken along the line 3B-3B of the same according to the first embodiment of this invention.

As shown in FIGS. 3A and 3B, rotating body 30 comprises outer iron core 31*a* located at the outermost side having a plurality of insertion holes 33, dielectric layer 50, and inner iron core 31*b* at the innermost side, which are arranged in this order toward the inner periphery. In addition, permanent magnets 32 such as neodymium group rare-earth sintered magnets are inserted individually in insertion holes 33. Dielectric layer 50 is a layer formed of an insulation resin. In this embodiment, dielectric layer 50 of this kind is provided for the purpose of retarding electrolytic corrosion. Dielectric layer 50 shown in FIGS. 3A and 3B is an example having an annular shape formed between the inner side and the outer side of rotating body 30 in a manner to encircle around shaft 16. Rotating body 30 has a single unitary structure comprising outer iron core 31*a* that retains the plurality of permanent magnets 32, the insulation resin configuring dielectric layer 50, and inner iron core 31*b*, as illustrated here. Rotating body 30 is fixed to shaft 16 on fixing surface 35 around an inner periphery of inner iron core 31*b*. Rotor 14 supported by bearings 15 is thus completed.

Dielectric layer 50 in rotating body 30 is a layer formed of the insulation resin having an insulating property, and it insulates and separates serially between outer iron core 31*a* and inner iron core 31*b*. On the other hand, dielectric layer 50 allows a high-frequency current to flow between outer iron core 31*a* and inner iron core 31*b* since it is formed of the insulation resin that has a given value of dielectric constant.

When dielectric layer 50 of this kind is not provided here, the impedance between the shaft connected electrically with the rotating body and the stator core becomes low as opposed to the high impedance between the stator core and the brackets, as discussed above. This results in a high-frequency current of pulse-width modulation generated in the stator core and the like to flow into an equivalent circuit having such impedance components. There is thus a potential difference due to the high-frequency current that appears between the outer ring of the bearing connected electrically with the bracket and the shaft on the inner-ring side of the bearing.

In this embodiment, the impedance of rotor 14 is increased to approximate it to the impedance on the bracket side by providing the rotating body of otherwise a low impedance of the rotor with dielectric layer 50 shown in FIG. 2. In other words, the provision of dielectric layer 50 between outer iron core 31*a* and inner iron core 31*b* composes rotor 14 of a structure equivalent to an electrostatic capacitance of dielectric layer 50 connected in series, thereby increasing the impedance of rotor 14. This structure can reduce the electric potential of shaft 16 produced by the high-frequency current since the increased impedance of rotor 14 increases a voltage drop of high frequency current that flows from rotor 14 to shaft 16. The brushless motor of this embodiment hence reduces the potential difference between the outer rings of bearings 15 connected electrically with output-shaft side bracket 17 and un-output-shaft side bracket 19 and shaft 16 on the inner-ring side of bearing 15 attributed to the high-frequency current, on the basis of the above principle. As has been discussed previously, this embodiment avoids the decrease in the impedances of output-shaft side bracket 17 and un-output-shaft side bracket 19, and maintains the condition of high impedances for both of output-shaft side bracket 17 and un-output-shaft side bracket 19 by insulating output-shaft side bracket 17 and un-output-shaft side bracket 19 from stator core 11. As a result, the electric potentials are kept low on the bearings, and a potential difference between the inner rings and the outer rings of these bearings are maintained in a low condition with the low potentials, thereby retarding occurrence of the electrolytic corrosion in the bearings.

Furthermore, this embodiment equalizes the electric potentials between output-shaft side bracket 17 and un-output-shaft side bracket 19, and suppresses the high-frequency current from flowing through the shaft by electrically connecting the two brackets through conductive pins 22 and 23. In addition, it becomes possible to bring a potential difference between the inner ring and outer ring of output-shaft side bearing 15a close to or equal to another potential difference between the inner ring and the outer ring of un-output-shaft side bearing 15b by equalizing the electric potentials of these brackets. In the structure of this kind, the potential difference between the inner ring and the outer ring, or the shaft voltage can be decreased for each of output-shaft side bearing 15a and un-output-shaft side bearing 15b by properly adjusting the impedance on the rotor side by using dielectric layer 50. Accordingly, this structure can prevent such a trouble that electrolytic corrosion occurs only in one of the bearings whereas the electrolytic corrosion can be retarded in the other bearing. It thus becomes possible to retard the electrolytic corrosion of the bearings that occur due to the high frequency wave of the PWM and the like while ensuring the fixing strength of the bearings, since the potential difference can be decreased in this manner between the inner ring and the outer ring of each of the two bearings fixed with the conductive brackets.

In addition, the impedance of rotor-14 side can be set to an optimum value since the electrostatic capacitance is variable by changing a width and material of dielectric layer 50. That is, the electrostatic capacitance of dielectric layer 50 can be decreased by reducing the dielectric constant of the insulation resin that configures dielectric layer 50, increasing the thickness of the insulation resin (i.e., a distance between electrodes), reducing a surface area of the electrodes, and so on. The impedance of rotor 14 can be increased in this manner by decreasing the electrostatic capacitance made up of dielectric layer 50.

Moreover, syndiotactic polystyrene resin (hereinafter referred to as SPS) may be used as the insulation resin to form dielectric layer 50, which can provide a low dielectric constant, and it further increases the impedance of rotor 14 even when the insulation resin has a small thickness. That is, the resin generally used as the insulation resin of electric motors is any of polybutyrene terephthalate (referred to as PBT) resin, polyethylene terephthalate (PET) resin and the like materials reinforced with inorganic filler such as glass fibers, and these materials have dielectric constants of about 3.5. On the other hand, SPS resin has a dielectric constant of 2.6 for un-reinforced material and 2.8 for reinforced material, which are lower than the ordinary resins. The use of SPS resin is therefore suitable to achieve a reduction of the electrostatic capacitance in such a case where the maximum thickness of the insulation resin is structurally restricted and PBT or the like resin is not satisfactory due of low impedance.

In addition, the structure of rotating body 30 is such that dielectric layer 50 separates between outer iron core 31a and inner iron core 31b as shown in FIGS. 3A and 3B, which enables the rotor core and the insulation resin to be formed unitary without presetting shaft 16 in the manufacturing process. Since the structure shown in FIGS. 3A and 3B allows fabrication of rotating body 30 without the shaft in place, it can improve the productivity as compared to such another structure having a dielectric layer placed between the shaft and the rotor core. Moreover, the structure shown in FIGS. 3A and 3B is adaptable easily to a product changeover since shaft 16 can be fixed by riveting or press-fitting even when shaft 16 is changed to a different type, which can also improve the productivity.

Second Exemplary Embodiment

Figure 4:
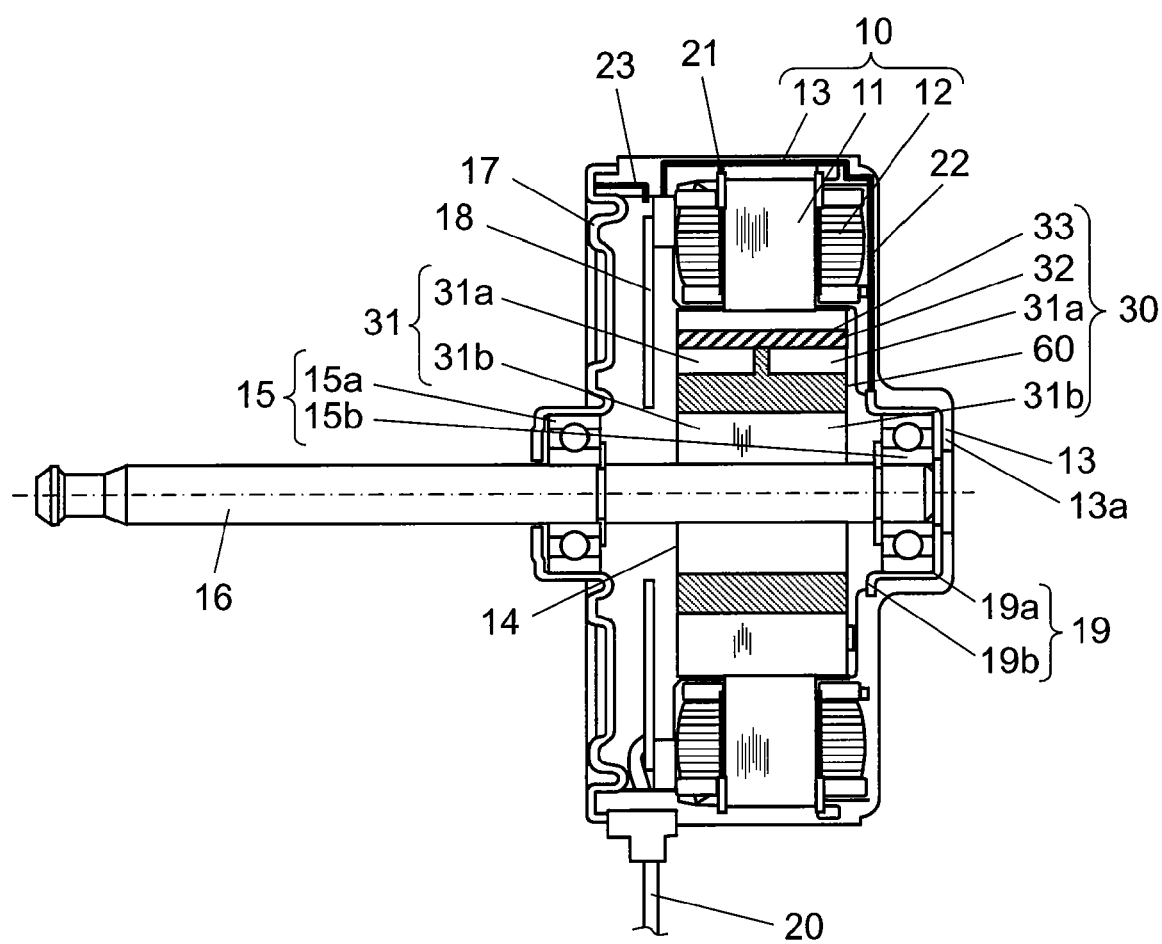
FIG. 4 is a structural drawing showing a section of a brushless motor according to a second exemplary embodiment of the present invention.
Figure 5A:
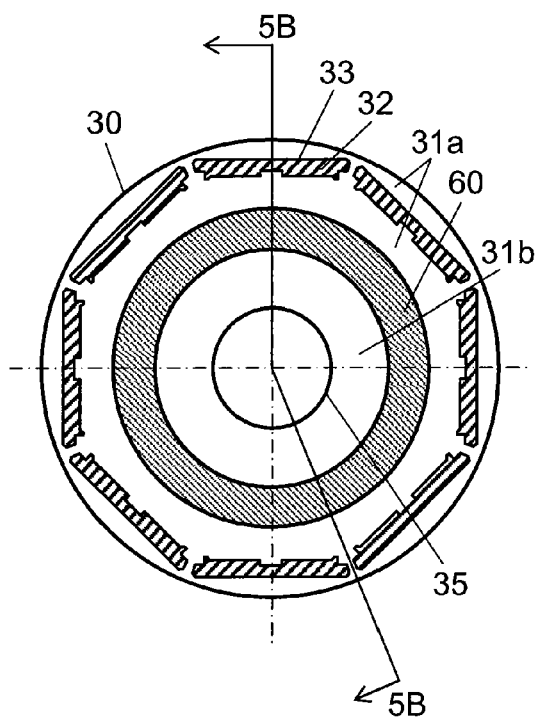
FIG. 5A is a top view showing a structure of a rotating body of the brushless motor.
Figure 5B:
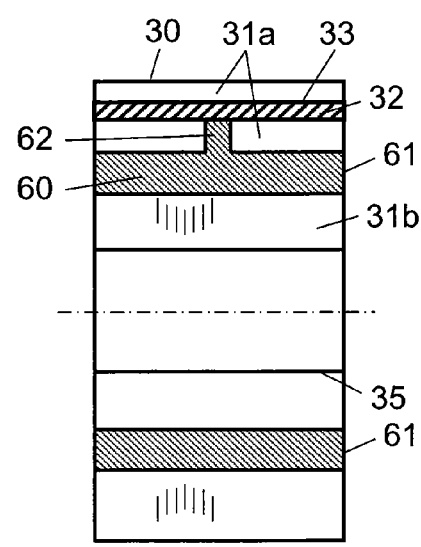
FIG. 5B is a drawing showing a section taken along line 5B-5B of FIG. 5A.

FIG. 4 is a structural drawing showing a section of a brushless motor according to second exemplary embodiment of the present invention. FIGS. 5A and 5B illustrate a top view of rotating body 30 of the brushless motor and a section taken along the line 5B-5B of the same according to the second embodiment of this invention. When compared with the first embodiment, the brushless motor representing an electric motor of this embodiment comprises rotating body 30 provided with dielectric layer 60 of a different shape than that of dielectric layer 50 of the first embodiment. All components other than dielectric layer 60 in this embodiment are generally similar to those of the first embodiment, and details of them will be skipped.

As shown in FIGS. 4, 5A and 5B, rotating body 30 of this embodiment comprises outer iron core 31a located at the outermost side having a plurality of insertion holes 33, dielectric layer 60, and inner iron core 31b, which are arranged in this order toward the inner periphery side. In addition, each of insertion holes 33 has a hole penetrating in the axial direction through outer iron core 31a, and permanent magnets 32 are inserted individually in insertion holes 33. Dielectric layer 60 is a layer formed of an insulation resin, and it is formed between the inner side and the outer side of rotating body 30 in a shape that encircles around shaft 16. Rotating body 30 of this embodiment has a single unitary structure comprised of outer iron core 31a that retains the plurality of permanent magnets 32, the insulation resin configuring dielectric layer 60, and inner iron core 31b, as illustrated here. Rotating body 30 is fixed to shaft 16 on fixing surface 35 around an inner periphery of inner iron core 31b. Rotor 14 supported by bearings 15 is thus completed. Dielectric layer 60 insulates and separates serially between outer iron core 31a and inner iron core 31b. That is, dielectric layer 60 of such a form is provided in this embodiment for the purpose of retarding electrolytic corrosion based on the same principle as described in the first embodiment.

Dielectric layer 60 is formed in a manner to extend cylindrically inside rotating body 30 from a lower end surface to an upper end surface. More specifically, dielectric layer 60 has a shape comprising cylindrical main body 61 formed to encircle around the shaft, and a plurality of protruding portions 62 protruding from main body 61, as shown in FIGS. 5A and 5B. That is, dielectric layer 60 is so shaped that the protruding portions are formed to protrude at least outward in a continually encircling manner. In addition, rotating body 30 is so constructed that each of protruding portions 62 is in contact with respective one of permanent magnets 32. In rotating body 30 shown in FIGS. 5A and 5B, individual protruding portions 62 protrude from main body 61 to the direction of outer periphery at an intermediate layer between the upper end surface and the lower end surface of rotating body 30. A protruding tip end of each of protruding portions 62 is in contact with the center area of each permanent magnet 32 in a manner to push permanent magnet 32 outward.

Rotating body 30 of this embodiment is constructed as illustrated above, and it is capable of preventing slippage between dielectric layer 60 and outer iron core 31a during rotation of rotating body 30 especially because dielectric layer 60 is provided with protruding portions 62. It can also improve strength of securing permanent magnets 32 to outer iron core 31a, and avoid a trouble such as slipping-out of permanent magnets 32 because of the structure wherein permanent magnets 32 are fixed by protruding portions 62. It is also possible to fix permanent magnets 32 to outer iron core 31a without using a bonding means such as adhesive, for example. In addition, this structure can prevent the magnets from being damaged due to impacts during magnetization.

It is more effective and preferable to provide dielectric layer 60 with protrusions such as protruding portions 62 on another side in contact with inner iron core 31b to prevent slippage.

Figure 6:
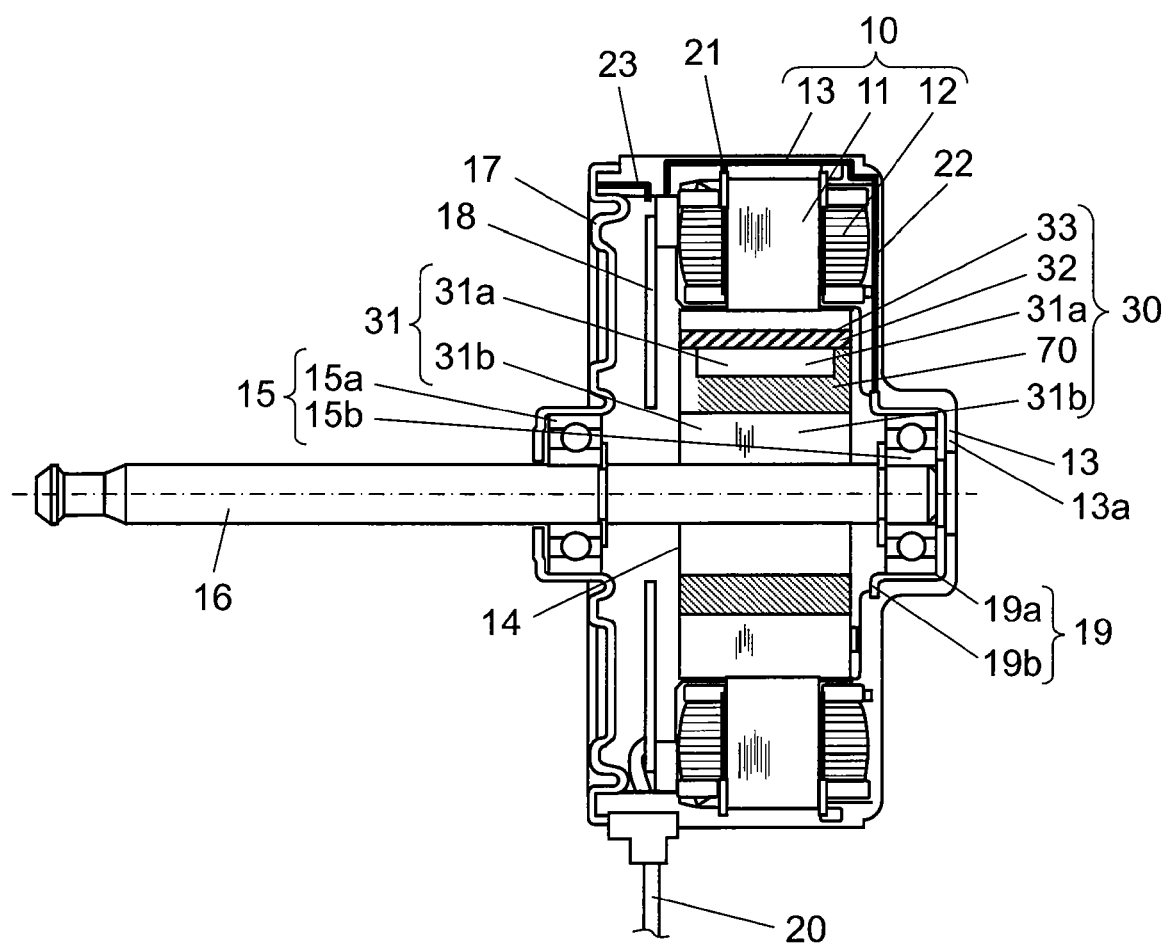
FIG. 6 is a structural drawing showing a section of another embodied example of the brushless motor.
Figure 7A:
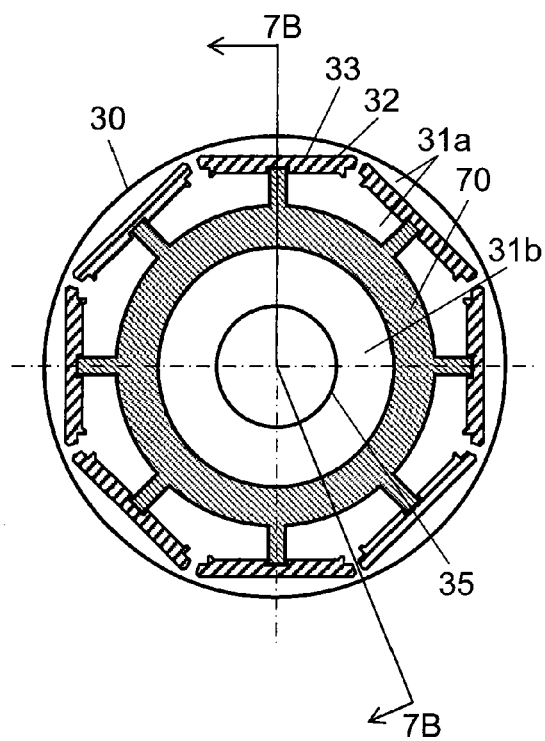
FIG. 7A is a top view showing another structure example of the rotating body of the brushless motor.
Figure 7B:
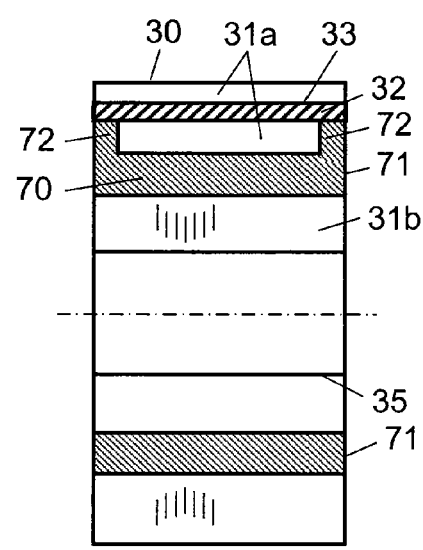
FIG. 7B is a drawing showing a section taken along line 7B-7B of FIG. 7A.

It is possible to freely set locations and shape where permanent magnets 32 are fixed in contact with dielectric layer 60. As an example of such variation, FIG. 6 shows a structural drawing illustrating a section of another exemplary configuration of the brushless motor according to the second embodiment of this invention. FIGS. 7A and 7B illustrate a top view and a section taken along the line 7B-7B of rotating body 30 of another exemplary configuration of the brushless motor according to the second embodiment of this invention. In this example, dielectric layer 70 has protruding portions 72 that protrude from main body 71 to the direction of outer periphery at both the upper end surface and the lower end surface of rotating body 30, as shown in FIGS. 6, 7A and 7B. Main body 71 has a shape similar to main body 61 illustrated above. Upper and lower protruding portions 72 are in contact with permanent magnets 32 in a manner to push permanent magnets 32 outward. This structure is also capable of avoiding troubles such as slippage during rotation and slipping-out of permanent magnets 32 in the same manner as the structure of FIGS. 5A and 5B.

As described above, dielectric layer 60 or 70 of this embodiment comprises main body 61 or 71 formed in a manner to encircle around shaft 16, and a plurality of protruding portions 62 or 72 that protrude from main body 61 or 71, and protruding portions 62 and 72 are arranged to be in contact with their respective permanent magnets 32. Because of the structure provided with any of dielectric layers 60 and 70, it is capable of preventing slippage in the rotation and improving the strength of securing permanent magnets 32 besides the capability of retarding the electrolytic corrosion.

Description is provided hereinafter of the present invention in more details by using an embodied sample. It should be understood that the embodied samples described herein are not intended to limit the scope of the present invention, and that any other modifications and variations are not restricted by these embodied samples unless departed from the true spirit and scope of the present invention.

Embodied Sample 1

A brushless motor of the structure shown in FIG. 4 was prepared by using rotating body 30 having the structure shown in FIGS. 5A and 5B provided with dielectric layer 60 of 4 mm in the minimum resin thickness formed of a PBT resin of 3.6 in the dielectric constant, and a shaft voltage was measured.

Figure 8:
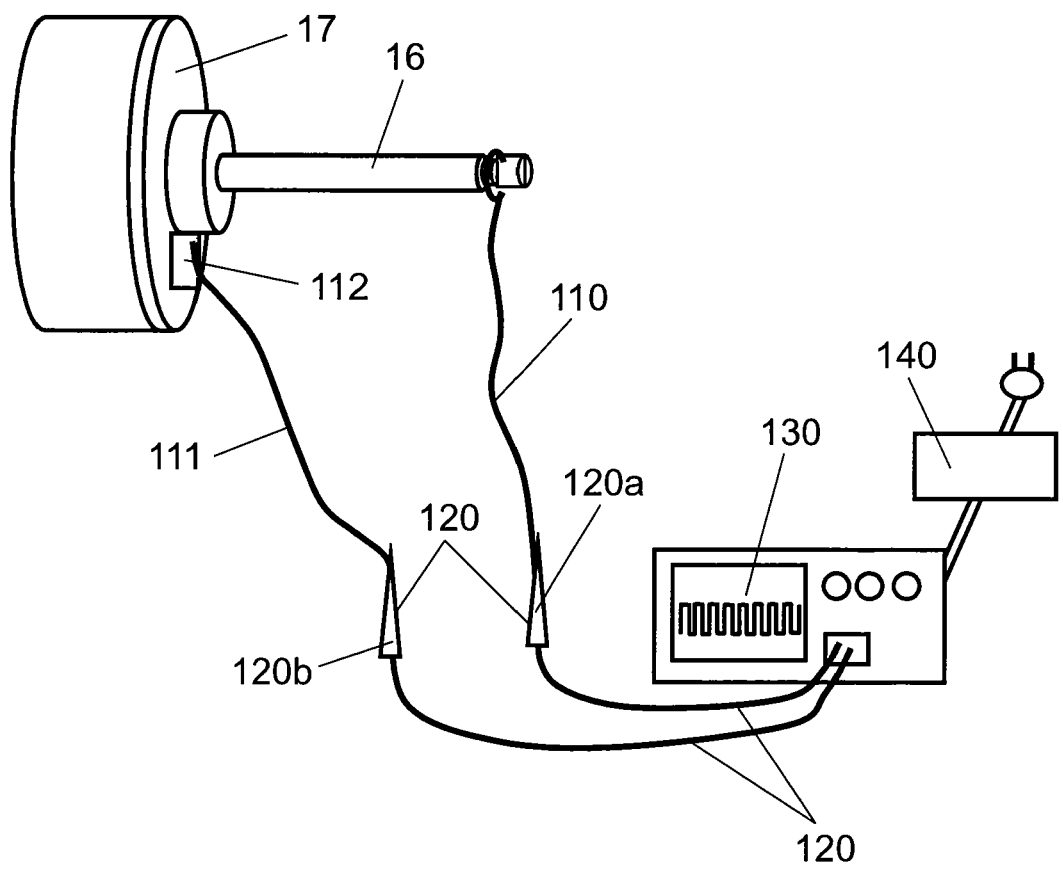
FIG. 8 is a drawing showing a method of measuring a shaft voltage of an embodied sample 1.

FIG. 8 is a drawing showing a method of measuring the shaft voltage of the embodied sample 1. A stabilized DC power supply was used when measuring the shaft voltage, and the measurement was made with power supply voltage Vcc of 391V for the coil and another power supply voltage Vdc of 15V for the control circuit, and under same operating condition of 1000 r/min in the rotating speed. The rotating speed was adjusted by regulating control voltage Vsp, with the brushless motor positioned so that the shaft is oriented horizontal during the operation.

In the measurement of the shaft voltage, a voltage waveform was observed with digital oscilloscope 130 and high-voltage differential probe 120 to check whether any corruption of the waveform is present, and the shaft voltage taken by reading a peak-to-peak voltage.

Corruption of the waveform of the shaft voltage was classified into one of three groups consisting of complete corruption, partial corruption and no corruption.

Figure 9:
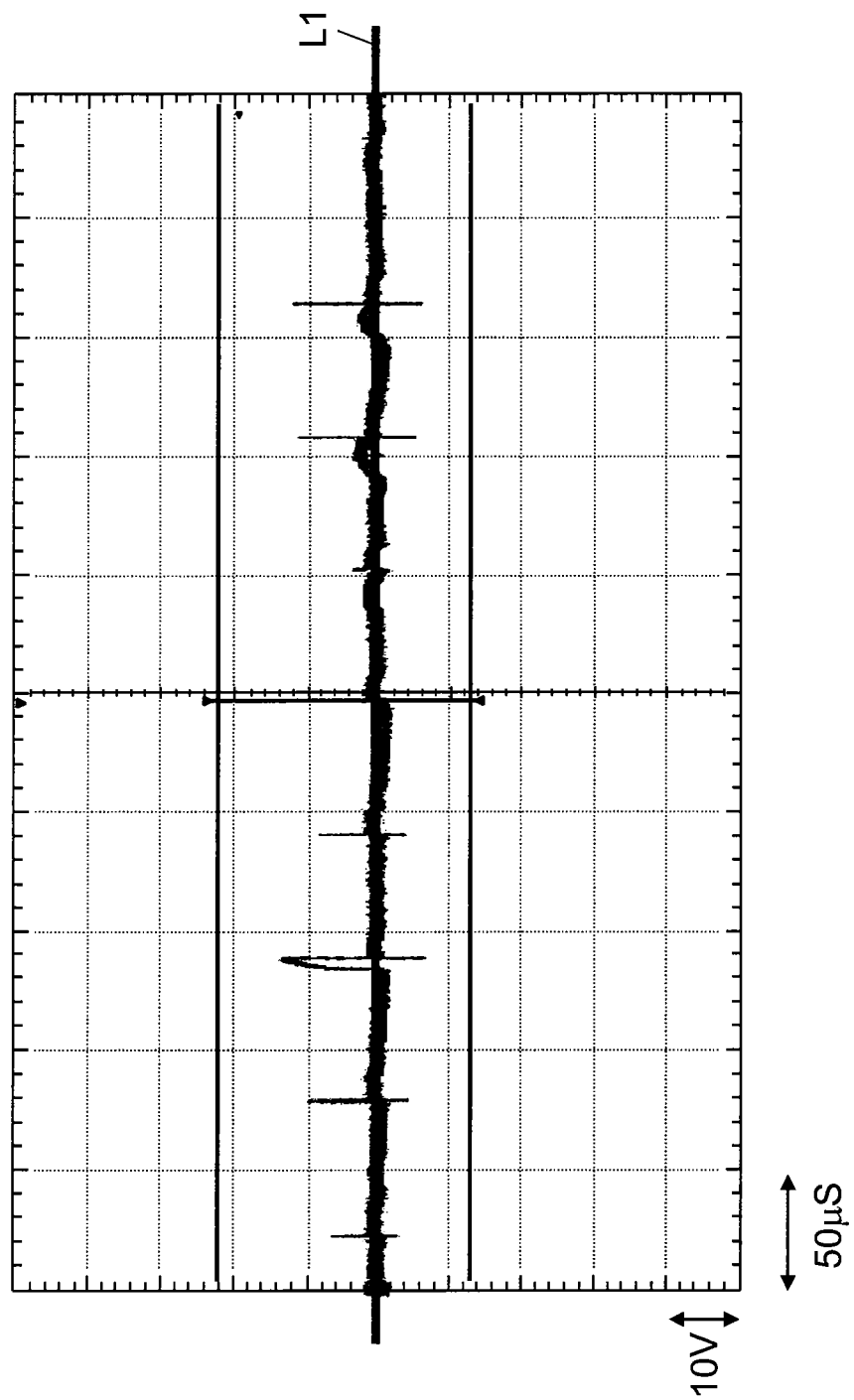
FIG. 9 is a graph showing an example of a completely corrupted waveform.
Figure 10:
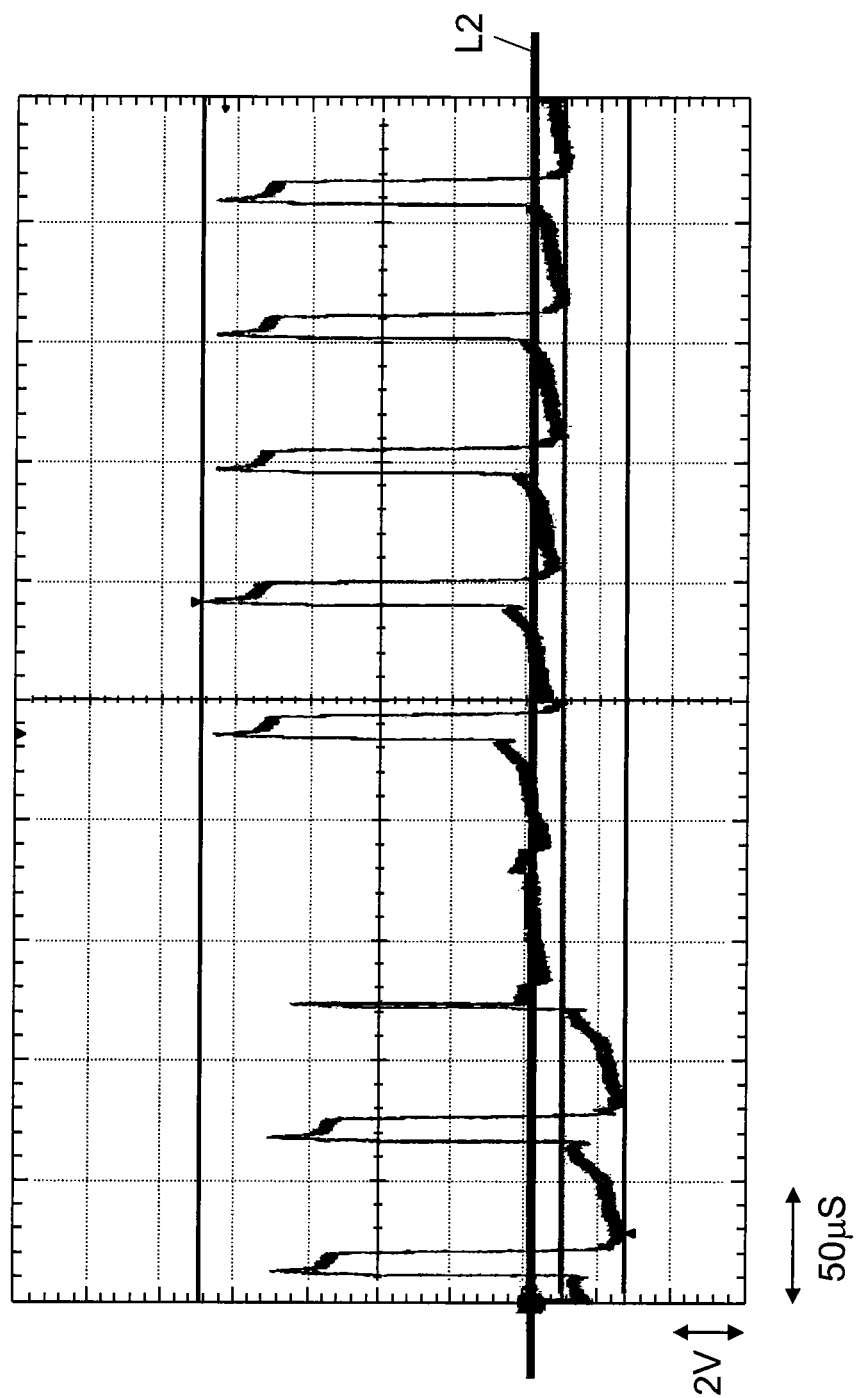
FIG. 10 is another graph showing an example of a partly corrupted waveform.
Figure 11:
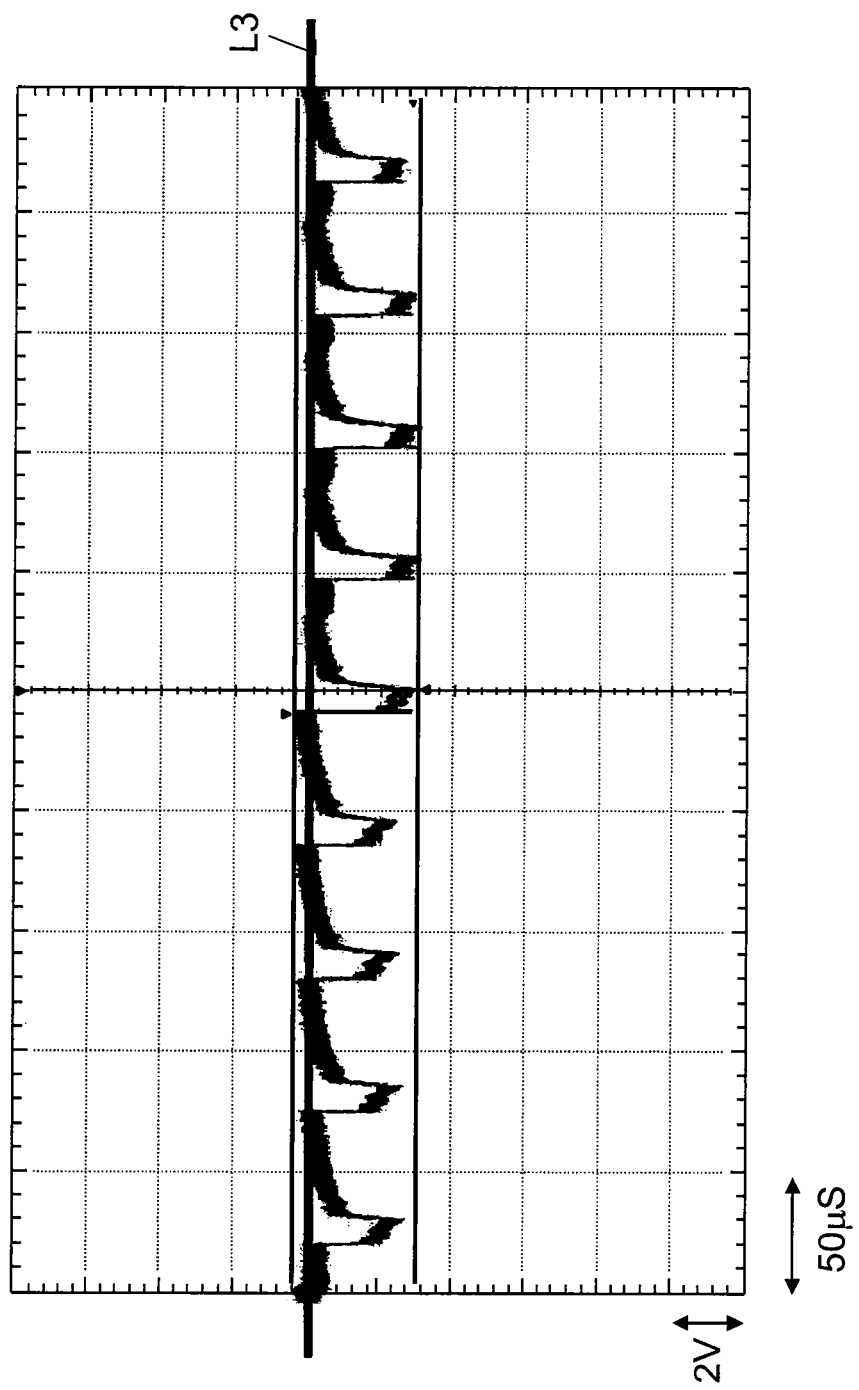
FIG. 11 is another graph showing an example of a waveform having no corruption.

FIG. 9 to FIG. 11 are graphs showing examples of such waveform corruptions, wherein FIG. 9 is a waveform of complete corruption, FIG. 10 is a waveform of partial corruption, and FIG. 11 is a waveform of no corruption. In FIG. 9 to FIG. 11, time of the horizontal axis is set to the same condition of 50 μs/div throughout all the measurements, and L1 to L3 are the lines of zero voltage. Digital oscilloscope 130 is isolated with isolation transformer 140.

A positive side 120a of high-voltage differential probe 120 is electrically connected to shaft 16 through lead wire 110 of about 30 cm in length, an end of which is formed into a loop of about 15 mm in diameter, and an inside circumference of the loop is placed in contact with the periphery of shaft 16. A negative side 120b of high-voltage differential probe 120 is electrically connected to output-shaft side bracket 17 through lead wire 111 of about 30 cm in length by making one end of lead wire 111 in contact with output-shaft side bracket 17 with conductive tape 112. The measurement was made with the above configuration for the shaft voltage of output-shaft side bearing 15a that is a voltage between output-shaft side bracket 17 and shaft 16.

Reference Sample 1

Figure 12:
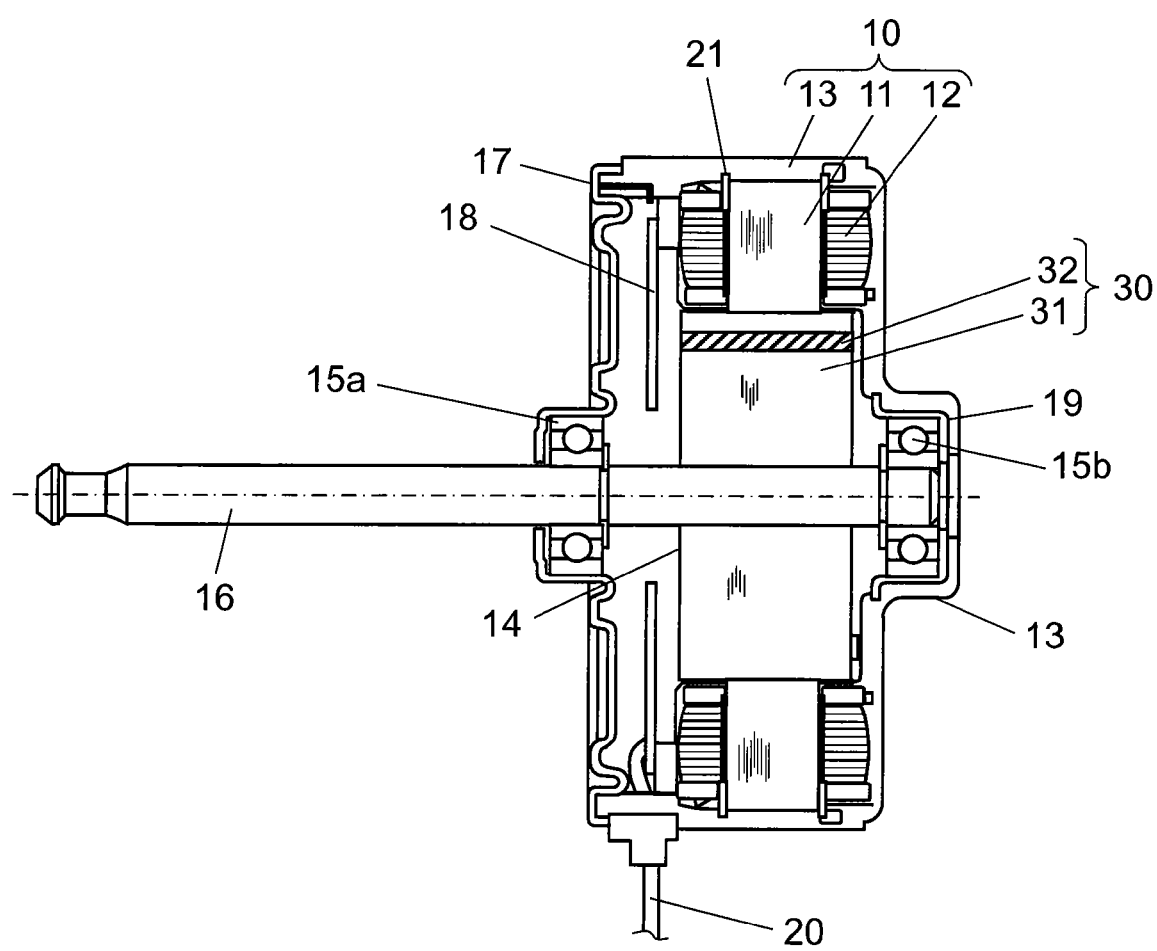
FIG. 12 is a structural drawing showing a section of a brushless motor of reference sample 1.

A rotor of the same shape as shown in FIGS. 5A and 5B was used except that it is not provided with a dielectric layer that insulates between outer iron core 31a and inner iron core 31b. FIG. 12 is a structural drawing illustrating a section of the brushless motor of reference sample 1, and FIGS. 13A and 13B illustrate a top view and a section taken along the line 13B-13B of the brushless motor of reference sample 1. As shown in the sectional view of FIG. 12, the brushless motor prepared here is of the same shape as FIG. 1 except that output-shaft side bracket 17 and un-output-shaft side bracket 19 are not electrically connected. The evaluation was carried out by following the same method as embodied sample 1.

Table 1 below shows a result of the evaluation of the embodied sample 1 and reference sample 1.

TABLE 1

|  | Reference Sample 1 | Embodied Sample 1 |
|---|---|---|
| Shaft Voltage (V) | 27.5 | −6.2 |
| Waveform Condition | Completely corrupted | Not corrupted |

As is obvious from the evaluation result in Table 1, the shaft voltage can be decreased by providing any of dielectric layers 50, 60 and 70 and adjusting the impedance.

As has been described above, the electric motor of the present invention includes a rotating body of the rotor having such structure that comprises an outer iron core configuring an outer peripheral portion of the rotating body, an inner iron core configuring an inner peripheral portion connected to a shaft, a dielectric layer disposed between the outer iron core and the inner iron core, a plurality of insertion holes that penetrate the outer iron core in the axial direction, and permanent magnets inserted individually into the plurality of insertion holes.

The rotor of low impedance composed of the dielectric layer disposed between the shaft and the outer iron core of the rotating body makes up a structure equivalent to a series connection consisting of an electrostatic capacitance formed by the dielectric layer, and it thereby increases the impedance on the rotor side. It thus becomes possible to bring both impedances on the inner-ring side and the outer-ring side of individual bearings close to each other. This can make high-frequency electric potentials well balanced between the inner-ring side and the outer-ring side of the bearings, which can retard the electrolytic corrosion liable to occur in the bearings due to high frequency currents by the PWM and the like. Thus provided according to the present invention is the electric motor capable of retarding electrolytic corrosion liable to occur in the bearings. By mounting the electric motor of the present invention, there can be provided an electric device equipped with the electric motor capable of retarding electrolytic corrosion prone to occurring in the bearings.

In the above exemplary embodiment, although the dielectric layer has been described as having certain shapes, as examples, it should be understood that the dielectric layer can be formed into any other shape as long as it has a sufficient electrostatic capacitance to increase the impedance of the rotor.

Third Exemplary Embodiment

As a third exemplary embodiment, description is provided in detail of a structure of an air conditioner's indoor unit as an example of the electric device according to the present invention.

Figure 14:
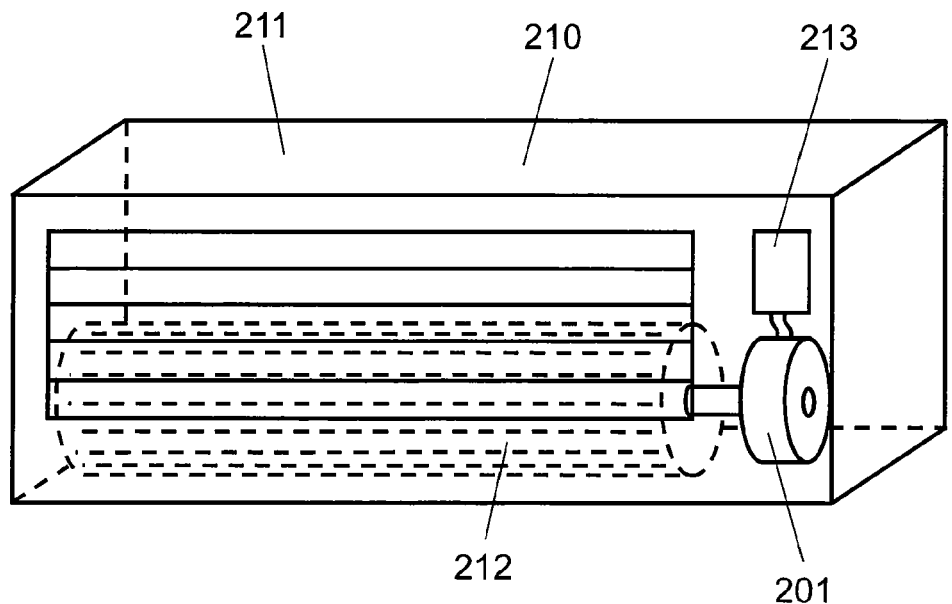
FIG. 14 is a structural drawing showing a general configuration of an electric device (i.e., air conditioner's indoor unit) according to a third exemplary embodiment of the present invention.

FIG. 14 is a structural drawing of the electric device according to the third embodiment of this invention.

In FIG. 14, air conditioner's indoor unit 210 is provided with electric motor 201 mounted inside casing 211. Electric motor 201 has cross-flow fan 212 attached to its rotary shaft. Electric motor 201 is driven by motor driving unit 213. Electric motor 201 rotates when energized by motor driving unit 213, which in turn rotates cross-flow fan 212. The rotation of cross-flow fan 212 delivers the air conditioned by a heat exchanger (not shown) inside the indoor unit into the room. Any of the electric motors in the above-described first and second embodiments is adaptable for use as electric motor 201.

The electric device of the present invention comprises the electric motor and the casing wherein the electric motor is mounted, and the electric motor used here is one of the electric motors having the structure described in this invention.

Generally, electric motors used for air conditioner's indoor units and the like do not require any supplementary insulation since they do not pose the risk of electric shock. Accordingly, any of the motors used for the air conditioner's indoor units and the like has low impedance on the rotor side (i.e., inner ring side of the bearing) since the rotor is not provided with an insulated structure. On the other hand, it has high impedance on the stator side (outer ring side of the bearing) because of its insulated structure. It is likely in this case that a high shaft voltage appears due to an unbalanced condition resulting from a high potential of the inner ring side of the bearing as compared to a low potential of the outer ring side of the bearing. It is the shaft voltage of such a high potential that raises the possibility of developing electrolytic corrosion in the bearing. The electric motor of the above exemplary embodiment, when employed, can bring both impedances on the inner-ring side and the outer-ring side of the bearing close to each other. This can make high-frequency electric potentials balanced between the inner ring side and the outer ring side of the bearing, thereby retarding the electrolytic corrosion that is liable to occur in the bearing of the electric motor used for the air conditioner's indoor unit and the like.

Fourth Exemplary Embodiment

As a fourth exemplary embodiment, description is provided in detail of a structure of an air conditioner's outdoor unit as an example of the electric device according to this invention.

Figure 15:
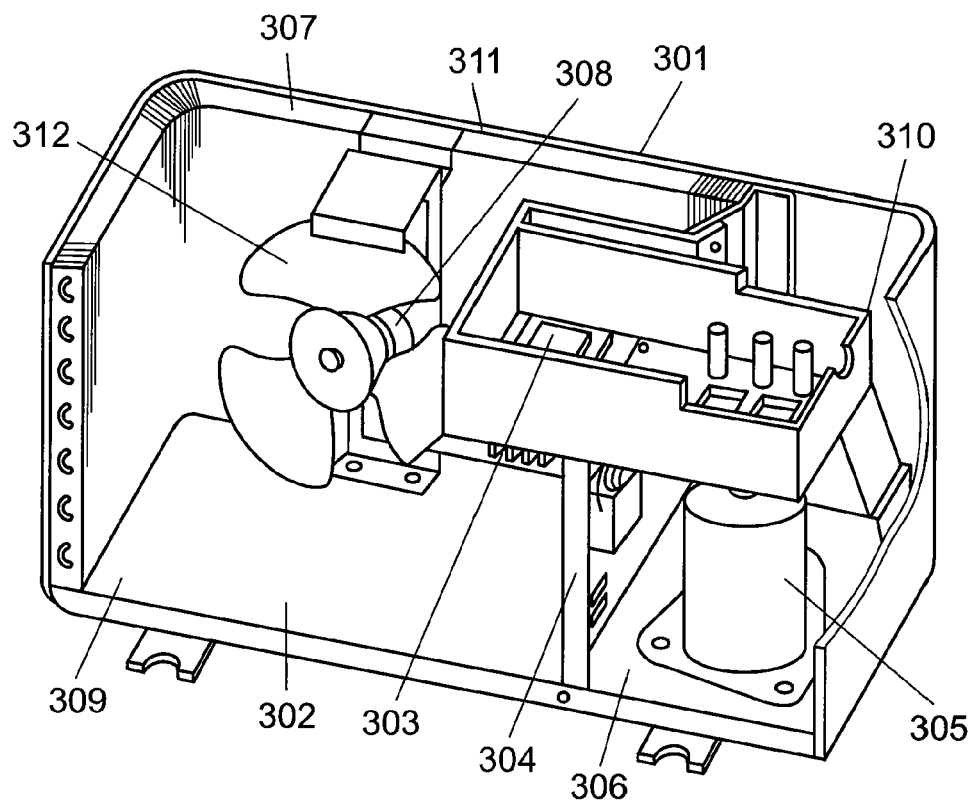
FIG. 15 is a structural drawing showing a general configuration of another electric device (i.e., air conditioner's outdoor unit) according to a fourth exemplary embodiment of the present invention.

FIG. 15 is a structural drawing of the electric device according to the fourth embodiment of this invention.

In FIG. 15, air conditioner's outdoor unit 301 is provided with electric motor 308 mounted inside casing 311. Electric motor 308 has fan 312 attached to its rotary shaft, and functions as a blower motor.

Air conditioner's outdoor unit 301 is divided into compressor room 306 and heat exchanger room 309 by bulkhead 304 disposed on base plate 302 of casing 311. Compressor room 306 houses compressor 305. Heat exchanger room 309 houses heat exchanger 307 and the blower motor. There is also electric control box 310 disposed above bulkhead 304.

Fan 312 rotates when the blower motor, or electric motor 308 is driven by motor driving unit 303 housed in electric control box 310, and blows air into heat exchanger room 309 through heat exchanger 307. Here, any of the electric motors in the above-described first and second embodiments is adaptable for use as electric motor 308.

The electric device of the present invention comprises the electric motor and the casing wherein the electric motor is mounted, and the electric motor used here is one of the electric motors having the structure described in this invention.

In general, electric motors used for air conditioner's outdoor units and the like do not require any supplementary insulation since they do not pose the risk of electric shock. Accordingly, any of the motors used for the air conditioner's outdoor units and the like has low impedance on the rotor side (i.e., inner ring side of the bearing) since the rotor is not provided with an insulated structure. On the other hand, it has high impedance on the stator side (outer ring side of the bearing) because of its insulated structure. It is likely in this case that a high shaft voltage appears due to an unbalanced condition resulting from a high potential of the inner-ring side of the bearing as compared to a low potential of the outer-ring side of the bearing. It is the shaft voltage of such a high potential that raises the possibility of developing electrolytic corrosion in the bearing. The electric motor of the above exemplary embodiment, when employed, can bring both impedances on the inner-ring side and the outer-ring side of the bearing close to each other. This can make high-frequency electric potentials balanced between the inner-ring side and the outer-ring side of the bearing, thereby retarding the electrolytic corrosion that is prone to occurring in the bearing of the electric motor used for the air conditioner's outdoor unit and the like.

Fifth Exemplary Embodiment

As a fifth exemplary embodiment, description is provided in detail of a structure of a water heater as an example of the electric device according to the present invention.

Figure 16:
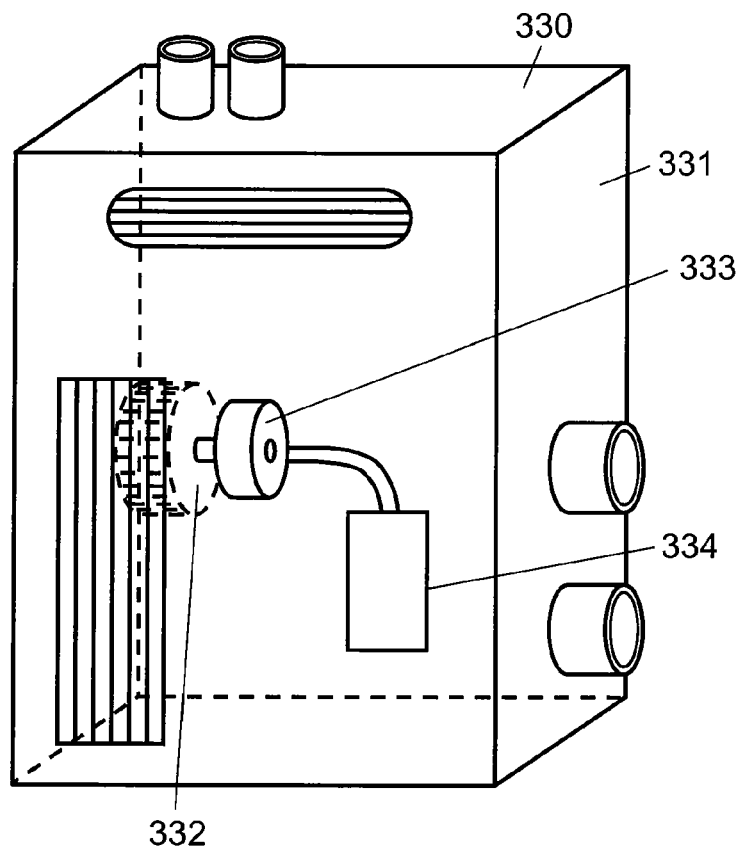
FIG. 16 is a structural drawing showing a general configuration of still another electric device (i.e., water heater) according to a fifth exemplary embodiment of the present invention.

FIG. 16 is a structural drawing of the electric device according to the fifth embodiment of this invention.

In FIG. 16, water heater 330 is provided with electric motor 333 mounted inside casing 331. Electric motor 333 has fan 332 attached to its rotary shaft. Electric motor 333 is driven by motor driving unit 334. Electric motor 333 rotates when energized by motor driving unit 334, which in turn rotates fan 332. The rotation of fan 332 delivers the air necessary for combustion into a fuel vaporization chamber (not shown). Any of the electric motors in the above-described first and second embodiments is adaptable for use as electric motor 333.

The electric device of the present invention comprises the electric motor and the casing wherein the electric motor is mounted, and the electric motor used here is one of the electric motors having the structure described in this invention.

In general, electric motors used for water heaters and the like do not require any supplementary insulation since they do not pose the risk of electric shock. Accordingly, any of the motors used for the water heaters and the like has low impedance on the rotor side (i.e., inner ring side of the bearing) since the rotor is not provided with an insulated structure. On the other hand, it has high impedance on the stator side (outer ring side of the bearing) because of its insulated structure. It is likely in this case that a high shaft voltage appears due to an unbalanced condition resulting from a high potential of the inner-ring side of the bearing as compared to a low potential of the outer-ring side of the bearing. It is the shaft voltage of such a high potential that raises the possibility of developing electrolytic corrosion in the bearing. The electric motor of the above exemplary embodiment, when employed, can bring both impedances on the inner-ring side and the outer-ring side of the bearing close to each other. This can make high-frequency electric potentials balanced between the inner-ring side and the outer-ring side of the bearing, thereby retarding the electrolytic corrosion that is prone to occurring in the bearing of the electric motor used for the water heater and the like.

Sixth Exemplary Embodiment

As a sixth exemplary embodiment, description is provided in detail of a structure of an air cleaner as an example of the electric device according to the present invention.

Figure 17:
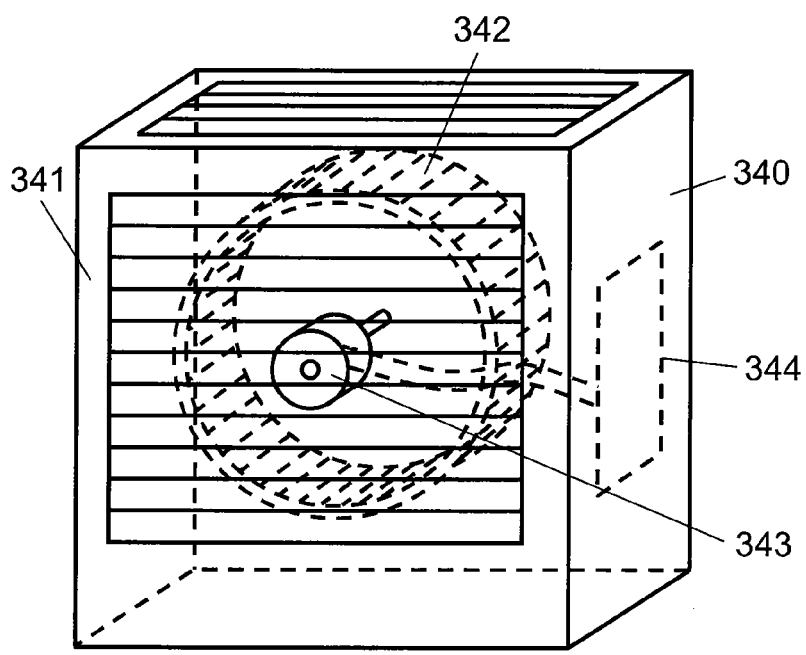
FIG. 17 is a structural drawing showing a general configuration of yet another electric device (i.e., air cleaner) according to a sixth exemplary embodiment of the present invention.

FIG. 17 is a structural drawing of the electric device according to the sixth embodiment of this invention.

In FIG. 17, air cleaner 340 is provided with electric motor 343 mounted inside casing 341. Electric motor 343 has fan 342 attached to its rotary shaft. Electric motor 343 is driven by motor driving unit 344. Electric motor 343 rotates when energized by motor driving unit 344, which in turn rotates fan 342. The rotation of fan 342 circulates air. Any of the electric motors in the above-described first and second embodiments is adaptable for use as electric motor 343.

The electric device of the present invention comprises the electric motor and the casing wherein the electric motor is mounted, and the electric motor used here is one of the electric motors having the structure described in this invention.

In general, electric motors used for air cleaners and the like do not require any supplementary insulation since they do not pose the risk of electric shock. Accordingly, any of the motors used for the air cleaners and the like has low impedance on the rotor side (i.e., inner ring side of the bearing) since the rotor is not provided with an insulated structure. On the other hand, it has high impedance on the stator side (outer ring side of the bearing) because of its insulated structure. It is likely in this case that a high shaft voltage appears due to an unbalanced condition resulting from a high potential of the inner-ring side of the bearing as compared to a low potential of the outer-ring side of the bearing. It is the shaft voltage of such a high potential that raises the possibility of developing electrolytic corrosion in the bearing. The electric motor of the above exemplary embodiment, when employed, can bring both impedances on the inner-ring side and the outer-ring side of the bearing close to each other. This can make high-frequency electric potentials balanced between the inner ring side and the outer ring side of the bearing, thereby retarding the electrolytic corrosion that is prone to occurring in the bearing of the electric motor used for the air cleaner and the like.

What have been described in the above third through sixth exemplary embodiments are the electric motors mounted to air conditioner's outdoor unit, air conditioner's indoor unit, water heater, air cleaner, and the like as the embodied examples of the electric devices according to the present invention. However, the present invention is also adaptable for other electric motors including motors mounted to various information devices and industrial equipment, as needless to mention.

The structure according to the embodiments of this patent application is so constructed that the power supply circuit of the drive circuit (including the control circuit and the like) for driving the electric motor with an inverter of the PWM method is electrically isolated from the primary circuit of the power supply circuit and the earth connection to the ground in the primary circuit side. Thus achievable is an advantage of retarding electrolytic corrosion in the bearing without adopting the conventional structure of electrically connecting the stator core and the like of the electric motor to the earth ground.

INDUSTRIAL APPLICABILITY

The electric motor of the present invention is capable of reducing the shaft voltage, and it is suitable for retarding electrolytic corrosion that occurs in the bearing. It is therefore useful for the electric motors mounted to such apparatuses as indoor units and outdoor units of air conditioners, water heaters, air cleaners and the like, for which low cost and long life are especially desired.

REFERENCE MARKS IN THE DRAWINGS

10 Stator
11 Stator iron core
12 Stator coil
13 Insulation resin
14 Rotor
15 Bearing
15a Output-shaft side bearing
15b Un-output-shaft side bearing
16 Shaft
17 Output-shaft side bracket
18 Printed board
19 Un-output-shaft side bracket
20 Connecting cable 21 Resin
22, 23 Conductive pin
30 Rotating body
31 Rotor core
31a Outer iron core
31b Inner iron core
32 Permanent magnet
33 Insertion hole
35 Fixing surface
50, 60, 70 Dielectric layer
61, 71 Main body
62, 72 Protruding portion
L1 to L3 Zero-volt line

The invention claimed is:

1. An electric motor comprising:
a stator having a stator core and a coil wound around the stator core;
a rotor having a rotating body positioned inside the stator and a shaft connected to the rotating body in a manner to penetrate through the center of the rotating body;
a bearing rotatably supporting the shaft; and
a bracket fixing the bearing;
wherein the rotating body comprises:
an outer iron core configuring an outer peripheral portion of the rotating body and comprising a plurality of insertion holes in an axial direction;
an inner iron core placed radially inside the outer iron core and configuring an inner peripheral portion connected to the shaft;
a dielectric layer disposed radially inside the outer iron core and radially outside the inner iron core, wherein the dielectric layer is formed of insulating resin so as to continuously surround the inner iron core and fixes the outer and inner cores together while electrically insulating one core from the other; and
permanent magnets inserted individually in the plurality of insertion holes.

2. The electric motor of claim 1, wherein the bracket includes two electrically conductive brackets, and the brackets are electrically connected to each other while being isolated from the stator core.

3. The electric motor of claim 2, wherein at least one of the two brackets and the stator core wound with the coil are unitarily molded with an insulation resin.

4. The electric motor of claim 2, wherein the two brackets are electrically connected inside the electric motor.

5. The electric motor of claim 1, wherein the dielectric layer comprises an insulating material for retarding electrolytic corrosion.

6. The electric motor of claim 1, wherein the dielectric layer is formed to encircle around the shaft.

7. The electric motor of claim 1, wherein the dielectric layer comprises a main body formed to encircle around the shaft, and a plurality of protruding portions protruding from the main body, wherein each of the protruding portions is disposed to come in contact with each of the permanent magnets respectively.

8. The electric motor of claim 7, wherein each of the protruding portions protrudes from the main body toward outer periphery at an intermediate area between an upper end surface and a lower end surface of the rotating body.

9. The electric motor of claim 7, wherein each of the protruding portions protrudes from the main body toward outer periphery at an upper end surface and a lower end surface of the rotating body.

10. An electric device equipped with the electric motor of claim 1.

* * * * *